United States Patent
Bailey et al.

(10) Patent No.: US 8,984,602 B1
(45) Date of Patent: Mar. 17, 2015

(54) PROTECTED RESOURCE ACCESS CONTROL UTILIZING CREDENTIALS BASED ON MESSAGE AUTHENTICATION CODES AND HASH CHAIN VALUES

(71) Applicant: EMC Corporation, Hopkinton, MA (US)

(72) Inventors: Daniel V. Bailey, Pepperell, MA (US); William M. Duane, Westford, MA (US); Aaron Katz, Haverhill, MA (US)

(73) Assignee: EMC Corporation, Hopkinton, MA (US)

( * ) Notice: Subject to any disclaimer, the term of this patent is extended or adjusted under 35 U.S.C. 154(b) by 62 days.

(21) Appl. No.: 13/931,083

(22) Filed: Jun. 28, 2013

(51) Int. Cl.
*G06F 17/30* (2006.01)
*G06F 21/31* (2013.01)

(52) U.S. Cl.
CPC ..................................... *G06F 21/31* (2013.01)
USPC .............. 726/6; 726/2; 726/4; 726/5; 726/17; 726/18; 726/19; 726/21

(58) Field of Classification Search
CPC ......... G06F 21/31; G06F 21/35; G06F 21/32; G06F 21/608; G06F 21/6218; G06F 2221/2115; G06F 3/1229; G06F 13/00; G06F 17/30132; G06F 17/30174; G06F 17/3023; G06F 17/30864; G06F 17/30867; G06F 17/30; H04N 21/4126; H04N 21/41407; H04N 2005/4412; H04N 21/20; H04N 21/235; H04N 21/2362; H04N 21/25816; H04N 21/2665; H04N 21/4135; H04N 21/42221; H04N 21/42684; H04N 21/435; H04N 21/43637
USPC .......... 726/2, 4, 5, 6, 17, 18, 19, 21; 380/255; 370/254
See application file for complete search history.

(56) References Cited

U.S. PATENT DOCUMENTS

| | | | | |
|---|---|---|---|---|
| 7,735,120 | B2 * | 6/2010 | Wallace et al. | 726/5 |
| 7,810,143 | B2 * | 10/2010 | Ruzyski et al. | 726/5 |
| 8,260,259 | B2 * | 9/2012 | Semple et al. | 455/411 |
| 2005/0256910 | A1 | 11/2005 | Kim et al. | |
| 2007/0150744 | A1 | 6/2007 | Cheng et al. | |

(Continued)

OTHER PUBLICATIONS

B. Groza et al., "On the Use of One-Way Chain Based Authentication Protocols in Secure Control Systems," The 2nd International Conference on Availability, Reliability and Security (ARES), Apr. 2007, pp. 1214-1221.

(Continued)

*Primary Examiner* — Thanhnga B Truong
(74) *Attorney, Agent, or Firm* — Ryan, Mason & Lewis, LLP

(57) ABSTRACT

A processing device comprises a processor coupled to a memory and is configured to receive authentication information from a user, to generate a message authentication code based at least in part on the received authentication information, to generate a credential for a particular access control interval based at least in part on the message authentication code and an intermediate value of a hash chain, and to provide the credential to a user in order to allow the user to access a protected resource in the particular access control interval. The message authentication code may be generated over a message payload that includes a password provided by the user. The credential may comprise a combination of the message authentication code and the intermediate value of the hash chain.

28 Claims, 4 Drawing Sheets

(56) References Cited

U.S. PATENT DOCUMENTS

2007/0174614 A1 7/2007 Duane et al.
2007/0279227 A1 12/2007 Juels

OTHER PUBLICATIONS

I. Dacosta et al., "Proxychain: Developing a Robust and Efficient Authentication Infrastructure for Carrier-Scale VoIP Networks," Proceedings of the USENIX Annual Technical Conference (ATC), Jun. 2010, 14 pages.

G. Lenzini et al., "Selective Location Blinding Using Hash Chains," Security Protocols Workshop, Mar. 2011, pp. 132-141.

K. Ren et al., "A Novel Privacy Preserving Authentication and Access Control Scheme for Pervasive Computing Environments," IEEE Transactions on Vehicular Technology, Jul. 2006, pp. 1373-1384, vol. 55, No. 4.

U.S. Appl. No. 13/629,771, filed in the name of D.V. Bailey et al. on Sep. 28, 2012 and entitled "Protected Resource Access Control Utilizing Intermediate Values of a Hash Chain."

* cited by examiner

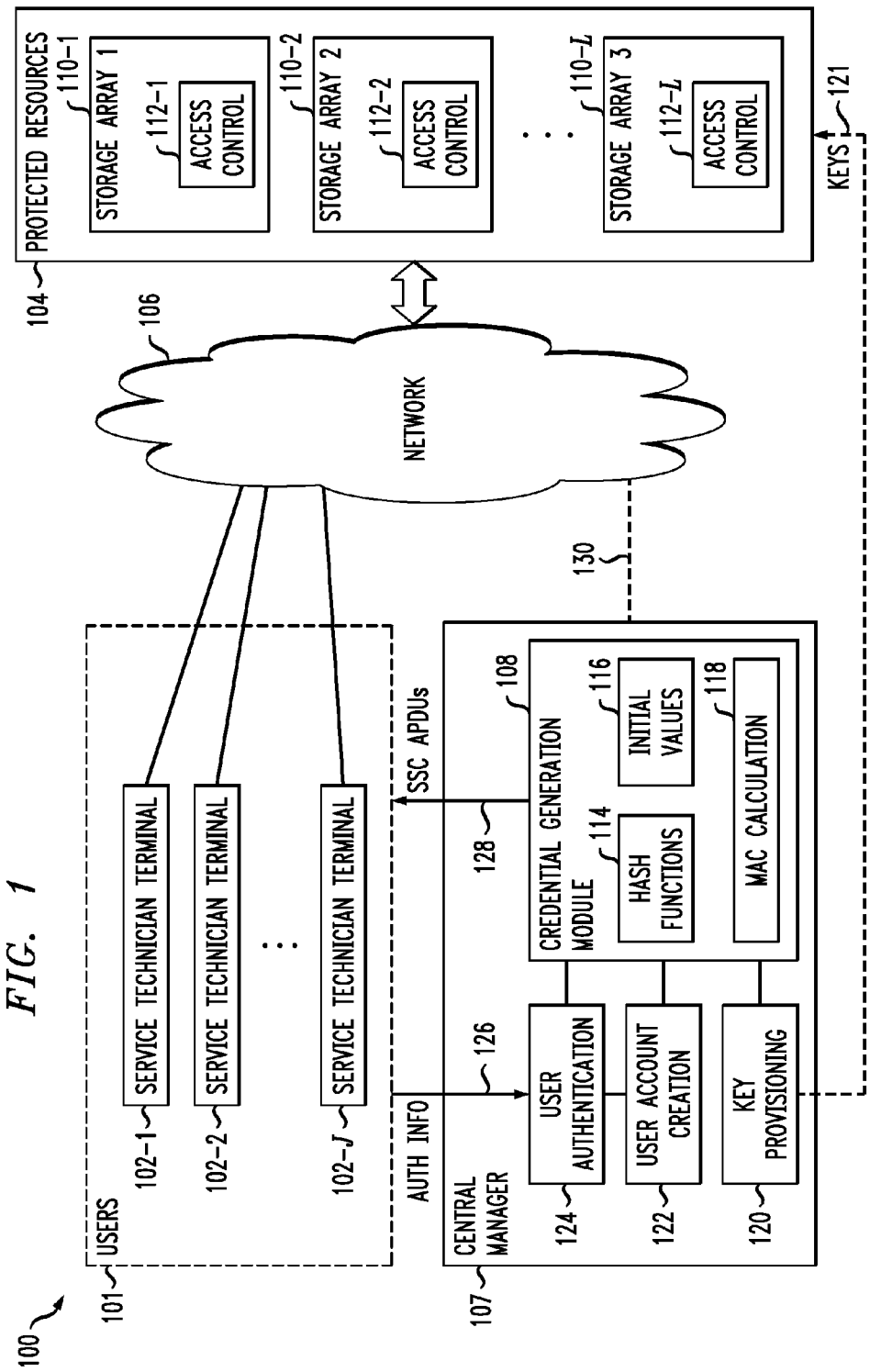

FIG. 2A

SSC APDU FORMAT

| FIELD NAME | USER ID | ROLE AND ACTIVITY | MAC + IHV |
|---|---|---|---|
| WIDTH (BITS) | 16 | 6 | 50 |

FIG. 2B

SSC APDU FORMAT WITH TIME INDICATION

| FIELD NAME | USER ID | ROLE AND ACTIVITY | START HOUR | DURATION | MAC + IHV |
|---|---|---|---|---|---|
| WIDTH (BITS) | 16 | 6 | 13 | 13 | 50 |

FIG. 2C

MAC CALCULATION FORMAT

| FIELD NAME | PASSWORD | YEAR | TIME WINDOW | VERSION | USER ID | ROLE AND ACTIVITY |
|---|---|---|---|---|---|---|
| WIDTH (BITS) | TBD | 8 | 8 | 2 | 16 | 6 |

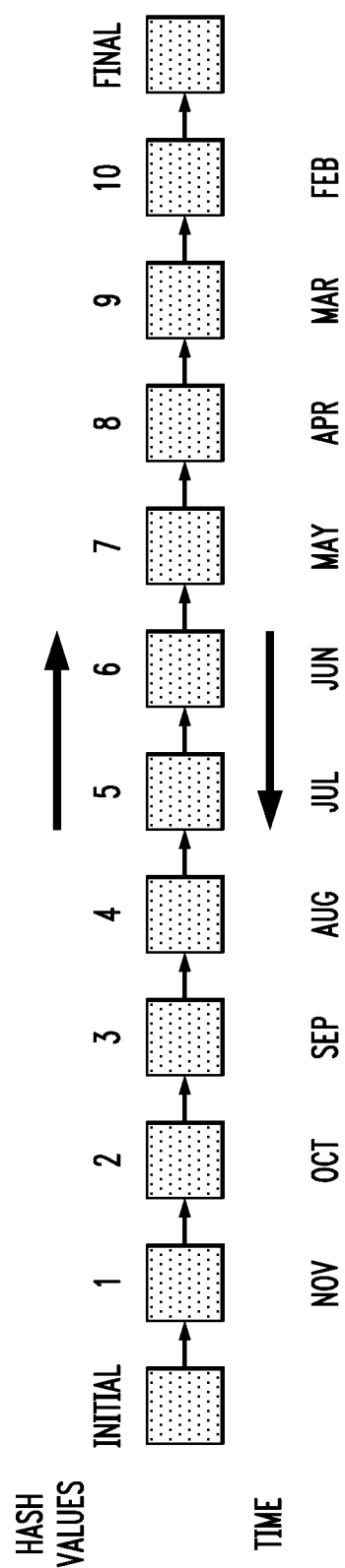

PROTECTED RESOURCE ACCESS CONTROL UTILIZING CREDENTIALS BASED ON MESSAGE AUTHENTICATION CODES AND HASH CHAIN VALUES

FIELD

The field relates generally to information security, and more particularly to techniques for providing secure access to protected resources.

BACKGROUND

Numerous techniques are known for providing secure access to protected resources. One widely-used approach involves the use of one-time passcode (OTP) devices such as hardware authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid. The secret value is an example of what is more generally referred to herein as a "key."

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Many authentication systems are configured to require that a user enter a personal identification number (PIN) or other static access code in addition to entering the passcode from the authentication token. This provides an additional security factor, based on something the user knows, thereby protecting against unauthorized use of an authentication token that is lost or stolen. Such an arrangement is generally referred to as two-factor authentication, in that authentication is based on something the user has (e.g., the authentication token) as well as something the user knows (e.g., the PIN).

Passcodes generated by authentication tokens can also be used as secure service credentials in order to allow service technicians to access storage arrays and other processing equipment for any repairs, tests, upgrades, or other service operations that may need to be performed after such equipment is deployed in the field. However, in this secure service access context, issues of key management become increasingly important. For example, a single key may be replicated on multiple storage arrays such that each of the storage arrays can support service technician access control based on passcodes generated using that same key. Such an arrangement is often desirable in that service technicians responsible for servicing a large number of storage arrays deployed in the field will need to keep track of fewer passcodes, but unfortunately it also creates a "break once, run anywhere" vulnerability in that an attacker who is able to compromise one of the storage arrays can then access any of the other storage arrays that share the same key.

These and other drawbacks of conventional practice are addressed in U.S. patent application Ser. No. 13/629,771, filed Sep. 28, 2012 and entitled "Protected Resource Access Control Utilizing Intermediate Values of a Hash Chain," which is commonly assigned herewith and incorporated by reference herein. Illustrative embodiments disclosed therein provide secure access to protected resources by utilizing intermediate values of at least one hash chain as respective access credentials. Arrangements of this type facilitate service technician access to storage arrays and other deployed processing equipment while also avoiding the above-noted "break once, run anywhere" vulnerability.

Despite the considerable advances provided by the techniques of the above-cited patent application, a need remains for further improvements in providing secure access to protected resources.

SUMMARY

Illustrative embodiments of the present invention provide secure access to protected resources by generating credentials for respective access control intervals using both message authentication codes and intermediate values of a hash chain. The credential for a particular access control interval is based on a message authentication code and an intermediate hash chain value associated with that interval.

By way of example, a given one of the message authentication codes can be generated over a message payload that incorporates received authentication information such as a user password. The message payload may further include additional information such as role and activity information for utilization by the protected resource to determine an appropriate level of access for the user. A credential for a particular one of the access control intervals may then be generated as a combination of the message authentication code and the intermediate hash chain value associated with the particular access control interval. Such an arrangement provides enhanced security and flexibility in controlling access to protected resources relative to conventional techniques.

In one embodiment, a processing device comprises a processor coupled to a memory and is configured to receive authentication information from a user, to generate a message authentication code based at least in part on the received authentication information, to generate a credential for a particular one of a plurality of access control intervals based at least in part on the message authentication code and an intermediate value of a hash chain, and to provide the credential to a user in order to allow the user to access a protected resource in the particular access control interval.

As noted above, the message authentication code may be generated over a message payload that includes a password provided by the user. The credential may be generated by associating intermediate values of the hash chain with respective ones of the access control intervals, and generating the credential for the particular access control interval as a function of the message authentication code and the intermediate value associated with the particular access control interval.

The credential for the particular access control interval may be generated by a central manager of an information processing system. It is also possible for the central manager to delegate to another system entity an ability to generate credentials for one or more other access control intervals.

The protected resource may comprise, for example, a storage array or other processing platform component, with the credentials controlling service technician access to that component.

BRIEF DESCRIPTION OF THE DRAWINGS

FIG. 1 shows an information processing system configured to implement secure access to protected resources using credentials based on message authentication codes and intermediate values of a hash chain in an illustrative embodiment of the invention.

FIGS. 2A and 2B show exemplary credential formats in illustrative embodiments.

FIG. 2C shows an exemplary message payload format used in calculating a message authentication code in an illustrative embodiment.

FIG. 5 is a diagram illustrating one possible technique for associating intermediate values of a hash chain with respective access control intervals in the FIG. 1 system.

DETAILED DESCRIPTION

Figure 3:
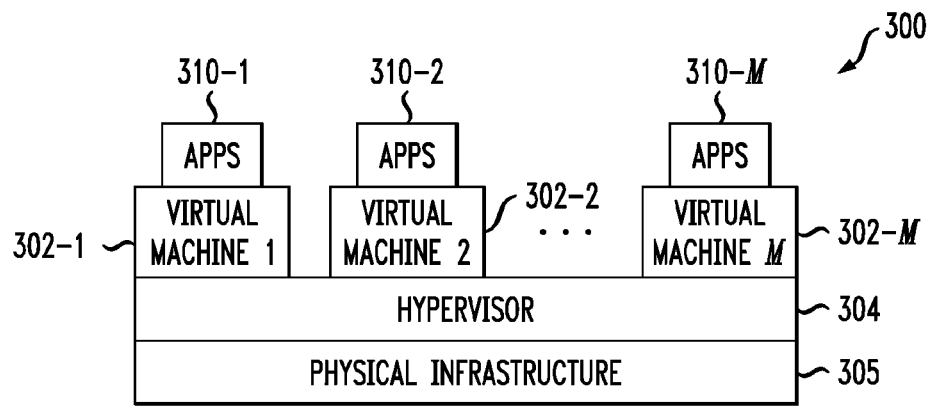
FIGS. 3 and 4 show examples of processing platforms that may be utilized to implement at least a portion of the FIG. 1 system.

Illustrative embodiments of the present invention will be described herein with reference to exemplary information processing systems and associated computers, servers, storage devices and other types of processing devices. It is to be appreciated, however, that the invention is not restricted to use with the particular illustrative system and device configurations shown. Accordingly, the term "information processing system" as used herein is intended to be broadly construed, so as to encompass, for example, any processing system comprising at least one processing platform, including systems comprising virtual machines and other cloud infrastructure.

FIG. 1 shows an information processing system 100 configured in accordance with an illustrative embodiment of the invention. The system 100 in this embodiment controls access by users 101 to protected resources. The system 100 comprises a plurality of terminals 102-1, 102-2, . . . 102-J that are configured to communicate with protected resources 104 over a network 106. The terminals 102 are illustratively shown as service technician terminals in this embodiment, but may be associated with other types of users in other embodiments. The term "user" as utilized herein is intended to be broadly construed so as to encompass, for example, a human user associated with a given device or set of devices, an automated user such as an application or other hardware or software component associated with a given device, or any other entity that may control that device.

Also coupled to the network 106 is a central manager 107. The central manager 107 comprises a credential generation module 108 that generates secure credentials that the service technicians associated with terminals 102 utilize to access the protected resources 104. As will be described in greater detail below, the credentials generated by module 108 and provided to service technicians or other users in system 100 are based on message authentication codes and intermediate values of a hash chain. The service technicians may be remotely accessing the storage arrays 110 via network 106 to provide repairs, tests, upgrades or other service operations, possibly pursuant to a service contract.

The protected resources 104 in this embodiment illustratively comprise storage arrays 110-1, 110-2, . . . 110-L, with the storage arrays being configured to incorporate respective access control modules 112-1, 112-2, . . . 112-L. Although shown by way of example as being implemented within the storage arrays 110 in this embodiment, the access control modules in other embodiments may be arranged external to the storage arrays, or otherwise associated with the storage arrays, and therefore possibly on different processing platforms than the storage arrays. Moreover, a given access control module can be used to control access to multiple storage arrays or other sets of protected resources in other embodiments. Accordingly, there need not be a one-to-one correspondence between access control modules and storage arrays as illustrated in FIG. 1.

The term "access control module" as used herein is therefore intended to be broadly construed so as to encompass these and other arrangements. Such a module may be implemented at least in part using software stored in a memory of a processing device and executed by a processor of that processing device.

The protected resources are not limited to storage arrays, and may additionally or alternatively comprise, for example, other types of processing platform components and associated secure data, in any combination.

The terminals 102 may comprise computers, mobile phones or other communication devices of any kind. Such devices are implemented in the form of respective processing devices. A given such processing device generally comprises at least one processor and an associated memory, and implements one or more functional modules for controlling certain features of the system 100. Other system elements such as central manager 107, credential generation module 108 and access control modules 112 may also be implemented using one or more processing devices each including processor and memory elements.

The processor in a given processing device of system 100 may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. The memory and other memories disclosed herein may be viewed as examples of what are more generally referred to as "computer program products" storing executable computer program code.

In addition to a processor and a memory, a processing device will generally include a variety of other types of circuitry, such as network interface circuitry that allows the processing device to communicate with other processing devices over one or more networks such as network 106. Such networks may include, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The network interface circuitry may comprise one or more conventional transceivers.

Although in the FIG. 1 embodiment communications between certain system elements are shown as passing through network 106, this is by way of illustrative example only and should not be construed as limiting in any way. For example, in other embodiments, one or more of the terminals 102 could be directly connected to the protected resource 104, and therefore communications between any such terminals and the protected resources 104 need not traverse the network 106. Similarly, communications between the central manager 107 and the terminals 102, and communications between the central manager 107 and the protected resources 104, need not be carried over network 106. A wide variety of alternative communication channels may be used in place of network connections for these and other communications described in conjunction with the FIG. 1 embodiment.

System elements such as elements 102, 104, 106, 107, 108, 110 and 112 may be implemented using one or more processing platforms each comprising multiple processing devices. Examples of processing platforms that may form portions of the system 100 will be described in more detail below in conjunction with FIGS. 3 and 4. Such processing platforms may comprise cloud infrastructure of a cloud service provider.

The system 100 in the present embodiment implements a process for controlling access to protected resources 104 by receiving authentication information from a user, generating a message authentication code based at least in part on the received authentication information, generating a credential for a particular one of a plurality of access control intervals based at least in part on the message authentication code and an intermediate value of a hash chain, and providing the credential to a user in order to allow the user to access a protected resource in the particular access control interval.

It should be noted that the term "allow" in this context does not preclude arrangements in which additional authentication information must be presented in combination with the credential in order to obtain access to the protected resource. More generally, the term is intended to cover any arrangement in which access control for a particular access control interval is conditioned at least in part on possession of a message authentication code and intermediate hash chain value for that access control interval. For example, possession of the credential may be one factor in a multi-factor authentication process that a user must complete in order to obtain access to the protected resource.

Operations such as generating message authentication codes, generating hash chains, associating intermediate values of a given one of the hash chains with the access control intervals, generating credentials based on the message authentication codes and the intermediate hash chain values, and providing credentials to users may be performed at least in part by the credential generation module 108 utilizing hash functions 114, initial values 116 and message authentication code calculation module 118. Each of the hash functions 114 may be used to hash one of the initial values 116 a particular number of times in order to generate a given hash chain that includes an initial value, a final value and a plurality of intermediate values. More particularly, the given hash chain can be generated by applying multiple iterations of a one-way hash function to an initial or previous value in each of a plurality of process steps in order to obtain respective ones of the intermediate values and a final value, where the number of intermediate values in some embodiments corresponds to the desired number of access control intervals to be supported.

The hash functions 114 may comprise any of a number of different known one-way hash functions or key derivation functions, including by way of example MD5, SHA-1, SHA-256 and BCrypt. Additional details regarding one or more of these and other conventional hash functions that may be adapted for use in embodiments of the present invention are disclosed in A. J. Menezes et al., Handbook of Applied Cryptography, CRC Press, 1997, which is incorporated by reference herein.

The credential generation module 108 in the present embodiment is implemented within the central manager 107. The central manager 107 in this embodiment comprises a central authority or other secure entity within the system 100. The central manager 107 generates keys in a key provisioning module 120. The keys are provided to access control modules 112 of the protected resources via a secure channel 121. These keys are also utilized by the module 118 to generate message authentication codes or MACs that are used in conjunction with intermediate values of a hash chain to provide credentials for controlling access to the storage arrays 110 of the protected resources 104. The provisioned keys are therefore also referred to herein as MAC keys.

In some embodiments, the key provisioning may be performed in conjunction with manufacture of one or more of the protected resources 104. For example, the provisioning of keys via secure channel 121 may take place at a manufacturing site of the storage arrays 110. A copy of the provisioned keys may then later be provided to the credential generation module 108 of the central manager 107. Accordingly, the key provisioning module 120 and possibly other modules of the central manager 107 may each be implemented at a different physical location in some embodiments of the invention.

The central manager further comprises a user account creation module 122 and a user authentication module 124. These modules also interact with the credential generation module 108.

The users 101 create user accounts with the central manager 107 via the user account creation module 122. In order to obtain credentials for accessing at least one of the storage arrays 110 in one or more access control intervals, the users provide authentication information 126 to the user authentication module 124 of the central manager 107. The users are authenticated in module 124 based on this authentication information. For example, the authentication information may comprise a password that was previously provided by the user at the time of account creation.

The term "password" as used herein is intended to be broadly construed so as to encompass passcodes, passphrases and other arrangements of multiple characters or other information utilized in authentication. For example, one-time passcodes generated by a hardware or software authentication token are considered passwords as the latter term is broadly used herein.

Authenticated users receive from the credential generation module 108 credentials which in this embodiment illustratively comprise respective secure service credential (SSC) application protocol data units (APDUs) 128, although a wide variety of other credential formats may be used in other embodiments. Detailed examples of SSC APDU formats will be described below in conjunction with FIGS. 2A and 2B.

The authentication information 126 and SSC APDUs 128 may be communicated between the terminals 102 and central manager 107 using any of a number of different communication mechanisms, some of which may involve network connections established over the network 106. For example, such communications may be implemented using a web login, SMS text messages, or other techniques.

In order to obtain access to one of the storage arrays 110 in a given access control interval, the user presents the appropriate SSC APDU to the corresponding access control module 112 via one of the terminals 102. The user also provides the same password that was used to authenticate to the central manager 107. Additional authentication information such as a user name or PIN may also be required. However, it is to be appreciated that embodiments of the invention do not require the use of such additional authentication data. For example, embodiments can be configured in which service technicians and other users share no previously-agreed user name or PIN with the storage array or its associated access control module, and instead utilize only the SSC APDU and the user password to gain access to the storage array.

The final values of the hash chains can be provided to each of the access control modules 112 in the protected resources 104. Alternatively, multiple final values may be generated for respective hash chains having respective distinct initial values, with the multiple final values being provided to respective ones of the access control modules 112 associated with respective storage arrays 110.

A given one of the access control modules 112 receives a credential and password from a user attempting to access a corresponding protected resource. The access control module performs an authentication process to determine if the user should be granted access to the protected resource in the current access control interval. Examples of such authentication processes will be described in greater detail below.

The credential generation module 108 knows the start of the hash chain, and can generate any of the intermediate values up to and including the final value. A given one of the access control modules 112 only needs to know the final value, and specifically should not know the initial value, but can still verify a provided intermediate value by driving it forward through repeated application of the hash function to see if the result matches the expected final value. Accordingly, compromise of one of the access control modules does not release the starting point of the chain.

In the FIG. 1 embodiment, the intermediate values of a given hash chain may be viewed as comprising respective secure service credentials utilized to allow the service technicians associated with terminals 102 to access certain ones of the storage arrays 112 in particular access control intervals. However, the SSC APDUs are more broadly applicable for use as authentication data in a wide variety of other types of access control systems. For example, different levels of access may be provided for different users for different types of tasks to be performed in relation to a storage array or other protected resource. Such arrangements may be viewed as types of role-based access control that may be implemented in embodiments of the invention.

In the system 100, the access control modules 112 are each provisioned with one or more cryptographic keys by the key provisioning module 120 of the central manager 107. These keys include keys referred to herein as MAC keys and are provisioned over secure channel 121 and after provisioning the protected resources 104 may be completely disconnected from the central manager 107 such that future communications between the central manager 107 and the protected resources 104 flow through users 101. Accordingly, after the keys have been provisioned to the protected resources 104, there is no need for continued network connectivity between the protected resources and the central manager 107 or its credential generation module 108.

The illustrative network connection 130 shown between network 106 and central manager 107 is shown in dashed outline in the figure to indicate that this connection may be a temporary or intermittent connection. The secure channel 121 may be a temporary secure connection provided between central manager 107 and protected resources 104 over network 106 only for purposes of key provisioning.

Accordingly, the network 106 may be configured to support communication of the protected resources 104 with only the terminals 102 and not the central manager 107 after the keys have been provisioned via the secure channel 121. It should be understood, however, that embodiments of the invention do not require any particular type or arrangement of network connections between the system elements.

A given one of the users 101 that has previously established an account with the central manager 107 authenticates to the central manager and upon successful authentication obtains from the central manager a credential in the form of an SSC APDU for accessing one or more of the storage arrays 110 in a given access control interval. The SSC APDU is presented by the user to an access control module 112 via one of the terminals 102.

As will be described in more detail below, the SSC APDU in the present embodiment is configured to allow the access control module 112 to identify the accessing user, to confirm that the user has presented an appropriate password, and to determine the particular level of access appropriate for that user.

In this embodiment, potentially untrusted users are in effect proxying messages between the central manager 107 and the access control modules 112 of the protected resources 104. Accordingly, the messages are configured so as to be short enough that they can reasonably be entered by users at terminals 102.

FIG. 2A shows the format of an SSC APDU in one embodiment. As mentioned previously, the SSC APDU is an example of what is more generally referred to herein as a "credential." Such a credential in the present embodiment is based at least in part on a message authentication code and an intermediate value of a hash chain. For example, in some embodiments, including those based on the SSC APDU format of FIG. 2A, the credential is based on a combination of the message authentication code and the intermediate hash value, with the combination being formed using a designated function. Numerous other credentials based at least in part on a message authentication code and an intermediate hash chain value may be used in other embodiments, so it should be understood that the SSC APDU of FIG. 2A is only one possible example.

The SSC APDU is generated by the credential generation module 108 and supplied to the user. It may be supplied over connection 130 or another connection established between the user or a corresponding user device and the central manager 107.

In order to obtain access to a given one of the storage arrays 110, the user enters the SSC APDU at one of the terminals 102. The user also enters the password that it utilized to authenticate to the user authentication module 124 of the central manager 107. The access control module 112 associated with the given storage array 110 uses the received SSC APDU and user password to authenticate the user and determine an appropriate level of access for that user.

The SSC APDU as illustrated in FIG. 2A comprises a plurality of fields including a User ID field, a Role and Activity field, and another field generated as a combination of a MAC and an intermediate hash value (IHV). The latter field is more particularly denoted as a MAC+IHV field in the figure. The SSC APDU is shown in binary format, and the User ID, Role and Activity and MAC+IHV fields have respective widths of 16 bits, 6 bits and 50 bits, although these and other field widths referred to herein are presented by way of illustrative example only and should not be construed as limiting in any way.

The User ID is a numeric identifier that maps to individual users in the central manager 107. The particular values of the User ID may be selected from within a predetermined range. In the present example, the 16-bit User ID field provides a range of $2^{16}$=65536 values, which may be denoted as 0-65535. The User ID is used in all the audit-log entries to identify the user along with the associated authentication actions (login, logoff, etc.). Additionally, applications in the protected resources 104 may log audit messages using the User ID to track product-specific actions of the user.

The Role and Activity field indicates one of up to $2^6=64$ different possibilities in this embodiment. The specific meanings of the field may be specific to particular products. For example, Symmetrix storage arrays selectively disable certain commands in a user shell. These and other products can use the Role and Activity field to determine an appropriate level of access for a given user.

The MAC+IHV field is a combination of a MAC and an IHV of a particular hash chain, and is assumed in the present embodiment to be formed as a bit-wise exclusive-or (XOR) of the MAC and the IHV, although other techniques for combining the MAC and THY may be used. The particular hash chain is generated by the credential generation module 108 using one of the hash functions 114 and has its initial value stored in the set of initial values 116. The corresponding final value of the hash chain is stored in one or more of the access control modules 112. The MAC portion of the MAC+IHV field is generated by performing a MAC calculation in module 118 over a message payload that includes the password provided by the user in creating the corresponding user account.

Numerous alternative formats are possible for the SSC APDU. Another exemplary format is shown in FIG. 2B, and includes in addition to the three fields of FIG. 2A two other fields that collectively provide an indication of a time period for which the SSC APDU is valid. These two additional fields comprise a Start Hour field indicating a start time of the particular access control interval, and a Duration field indicating the duration of the particular access control interval. The Start Hour and Duration fields in this example are each 13 bits in width. Other arrangements of one or more time period indicator fields may be used in other embodiments.

The SSC APDUs of FIGS. 2A and 2B are illustrated in binary format, but these binary formats are assumed to be subsequently encoded so as to reduce the number of digits relative to the binary formats, thereby facilitating presentation of the SSC APDU to the user and user entry of the SSC APDU into one of the terminals 102. This encoding can be performed in the credential generation module 108 or alternatively can be performed in a computer, mobile telephone or other processing device associated with the user. Thus, for example, the SSC APDU can be supplied to the user from the credential generation module 108 in the encoded format, or the user device may convert the SSC APDU from the binary format to the encoded format. In these and other similar arrangements, the user device will generally present the SSC APDU to the user in the encoded format so that the user can easily enter the SSC APDU into the terminal 102. The term "credential" as used herein should be understood as encompassing binary or encoded formats, as well as other types of formats.

The encoding of the binary format SSC APDUs of FIGS. 2A and 2B may be implemented, for example, using Base64 encoding. Base64 encoding generally converts groups of three octets of binary digits in the binary format into corresponding groups of four encoded characters in the encoded format. Accordingly, the 72 bits or nine octets of the FIG. 2A binary format SSC APDU can be represented as an encoded string of 12 characters. Numerous alternative encoding processes may be used in other embodiments. Also, depending on the widths of the fields, padding may be used as appropriate in these encoding processes, as will be readily appreciated by those skilled in the art.

FIG. 2C shows an exemplary message payload format used in calculating a MAC for inclusion in the MAC+IHV field of the SSC APDU in an illustrative embodiment. In this embodiment, the MAC is calculated in module 118 over a message payload that includes the user password, Year and Time Window fields providing an indication of a time period for which the SSC APDU is valid, a version indicator field, a User ID field and a Role and Activity field. The user password in the present embodiment is assumed to be the same password that the user submits in conjunction with account creation and user authentication processes performed by modules 122 and 124. It has a width that is listed in the figure as to be determined or TBD, based on password parameters established in the system 100. The fields denoted Year, Time Window, Version, User ID and Role and Activity fields have respective widths of 8, 8, 2, 16 and 6 bits, as indicated in the figure.

The SSC APDU in the present embodiment is configured to be valid for the duration of a time window as specified in the Time Window field. The time window may represent a range of dates using an integer. Like the password, the time window is utilized in calculating the MAC that is included in the SSC APDU, but is not otherwise explicitly sent to the user as part of the SSC APDU. If an access control module 112 receives an SSC APDU from a user outside of the time window specified in the corresponding MAC, access to the corresponding storage array is denied. If the SSC APDU is received near an edge of a particular time window, the access control module 112 may check it against the previous or following window as appropriate in order to account for clock drift.

As mentioned previously, the protected resources 104 in the present embodiment are not provisioned with the user password. Accordingly, the SSC APDU is generated utilizing the password and the valid time window as part of the MAC calculation. This allows the access control modules 112 to use the SSC APDU to validate the password submitted by the user in conjunction with an access attempt. The SSC APDU does not explicitly carry the password, as it is assumed that the user enters the password into one of the terminals 102 as part of the access attempt. Similarly, the SSC APDU does not explicitly carry the Year and Time Window fields, but instead these fields are used in the MAC calculation that generates the MAC for inclusion in the MAC+IHV field of the SSC APDU. It is assumed that the access control modules 112 can independently determine the current time window.

In the MAC calculation format of FIG. 2C, the message payload more particularly comprises a concatenation of the fields:

Payload=Password‖Year‖ . . . ‖Role and Activity.

The MAC calculation performed over this message payload illustratively utilizes a MAC key having a key size of 128 bits, and performs the calculation in accordance with the hashing algorithm HMAC-SHA-256. Numerous other techniques may be used to generate MACs in other embodiments.

As noted above, the SSC APDU comprises a combination of the calculated MAC and an IHV for a particular access control interval. The IHV is one of a plurality of intermediate values of a given hash chain generated in the credential generation module 108 using one of the hash functions 114 and having an initial value stored as part of the initial values 116. These intermediate values of the hash chain are associated in the credential generation module 108 with respective ones of the access control intervals. The final value of the hash chain is provided to one or more of the access control modules.

In generating the hash chain providing the intermediate values, the selected hash function is applied to the initial value a designated number of times to generate each intermediate value. Each of the resulting intermediate values is assumed to be truncated to 50 bits in the present embodiment in order to limit the size of these values to the available size of the MAC+IHV field in the SSC APDU.

By way of example, each intermediate value of a given hash chain may be generated using SHA-256 iterated 100,000 times. A 128-bit cryptographic key may be used as the initial value. This is assumed to be a secret value that is stored as one of the initial values 116 in the credential generation module 108 and is not accessible to the access control modules 112 of the protected resources.

At initialization, the number of access control intervals to be supported is determined. For example, using a time window of 4 days, a given year will have 92 windows. To provide access control over a total period of 20 years, the hash chain should be configured with 1,840 intermediate values in order to support respective ones of the 1,840 windows, each corresponding to an access control interval. Of course, these particular values are merely examples, and numerous other alternative values may be used as appropriate to the needs of a given implementation.

The final value of the hash chain is obtained after 1,841 steps in each of which SHA-256 is iterated 100,000 times and the resulting output is truncated to 50 bits. The first step is applied to the initial value and the final step provides the final value, with each of the first 1,840 steps generating an intermediate value that will be used in generating SSC APDUs for a corresponding one of the 1,840 access control intervals. The final value of the hash chain may be considered a public value and is deployed on one or more of the access control modules 112 of the protected resources 104. As noted above, the access control modules do not have access to the initial value and therefore have no ability to compute intermediate values.

Thus, in the above-described example, the credential generation module 108 generates a given intermediate value by repeatedly hashing the previous value in the chain 100,000 times and then outputting the most significant 50 bits of the 256-bit result. After outputting the most significant 50 bits of the intermediate value, the remaining bits are set to zero before starting the 100,000 hash iterations for the next value. This process is also referred to herein as "flattening" the hash chain values, and is utilized in the present embodiment due to the 50 bit width limitation of the MAC+IHV field of the SSC APDU.

The following pseudocode illustrates the hash chain generation process in the above-described example:
1. Temp=Initial
2. Repeat the following 1840 times:
   a. Repeat the following 100,000 times:
      i. Temp=SHA-256(Temp)
   b. Output truncate(Temp, 50).

As long as the selected hash function is a one-way function and the initial value remains secret, obtaining the final value does not help an attacker.

The hash function for each step is iterated 100,000 times to slow down a potential brute-force attacker.

It should be noted that this exemplary hash chain generation can be performed quickly on a modern processing device. For example, a processing device based on an Intel Core i7 processor with 10 cores running at 2.4 GHz can perform about 20 million hashes per second, such that all of the 1,840 intermediate values and the final value of the hash chain described above can be generated in less than 9 seconds.

Consider an attacker that obtains an intermediate hash value for one access control interval. In order for the attacker to determine the intermediate hash value for the next access control interval, the attacker must find a value that when hashed 100,000 times yields the value held by the attacker. Even with many processing devices of the type described above, this will take far longer than the duration of the next access control interval.

The intermediate values are associated with respective access control intervals in the credential generation module 108. As mentioned previously, the final value can be a public value and may be deployed on multiple storage arrays without providing any ability to compute intermediate values. The initial value is securely stored as indicated above, and the intermediate values are used in generating SSC APDUs for respective access control intervals. This involves associating the intermediate values with the access control intervals.

In the present embodiment, a first one of the intermediate values immediately following the initial value of the hash chain is associated with a final one of the access control intervals, and this reverse ordering continues through the intermediate values until a final one of the intermediate values immediately preceding the final value of the hash chain is associated with a first one of the access control intervals.

Thus, the first access control interval corresponds to the intermediate value immediately preceding the final value, such that hashing that intermediate value once yields the final value. Similarly, the second access control interval corresponds to the intermediate value that precedes the final value by two positions, such that hashing that intermediate value twice yields the final value. This inverse numbering continues with later access control intervals corresponding to respective intermediate values that are closer to the initial value and which therefore must be hashed more times to yield the final value. A more detailed example of this type of association between hash chain intermediate values and access control intervals will be described below in conjunction with FIG. 5.

The final value of the hash chain may be deployed on at least one of the storage arrays 110 by providing it to the corresponding access control module 112. As mentioned above, the final value from the same hash chain can be provided to each of the storage arrays, or different final values generated for different hash chains can be provided to each of the storage arrays. The final values in the present embodiment are considered public values and accordingly do not need to be provided over a secure channel.

An intermediate value associated with a particular interval is utilized to generate an SSC APDU as a credential to access a given storage array during that interval.

Upon receipt of the SSC APDU from a user in conjunction with access request, the intermediate value can be extracted from the SSC APDU and hashed an appropriate number of times to determine if the final value is obtained, as part of the process for authenticating the user in a given one of the access control modules 112.

An exemplary process for authenticating a user attempting to access one of the protected resources 104 may be as follows, assuming use of the SSC APDU format of FIG. 2A and the MAC calculation format of FIG. 2C.
1. Prompt the user for the APDU and password.
2. Compute a purported MAC using the supplied password, known Year, Time Window and Version information, and the User ID and Role and Activity fields extracted from the SSC APDU.
3. Perform a bit-wise XOR of the purported MAC with the MAC+IHV field of the SSC APDU to yield a purported IHV.
4. Validate the purported IHV by hashing it an appropriate number of times and comparing the result to the stored final value.

If the purported IHV is validated, the user is authenticated and is given access to the protected resource, although grant of access may possibly be conditioned on one or more additional checks beyond validation of the purported IHV.

Otherwise, the attempt is rejected.

As noted above, additional checks may be incorporated into the authentication process. For example, disable limit counters may be maintained that count the number of unsuccessful authentication attempts by a particular user within a given time frame. Further authentication attempts by that user after a specified disable limit has been reached may be automatically rejected.

Also, a check of the current time may be performed against a stored "high water mark." In embodiments that utilize time intervals such as such as hours, days, weeks or months to define access control intervals, a given access control module 112 may be configured to incorporate or otherwise access a clock in order to determine how many times to hash the intermediate value before the final value is reached. When the clock reaches the start of a predetermined access control interval, the access control module records this high water mark to disk or other nonvolatile storage. Then, during the validation of an intermediate value, the access control module checks the current clock value against the stored high water mark. If the current clock value precedes the high water mark in time, the authentication request is rejected and additional auditing actions may be taken such as, for example, recording the suspected clock tampering incident to a log, or alerting an administrator.

The high water mark may be recorded, for example, in a Last Login field of a secure data structure of the access control module as the latest time window for which a valid SSC APDU has been received by the access control module.

The computation of the purported MAC in the above-described exemplary protocol utilizes the provisioned key provided to the access control module by key provisioning module 120 via secure channel 121. This key may be stored in the above-noted secure data structure or other secure storage location of the access control module or associated protected resource. The computation uses the same HMAC-SHA-256 hashing algorithm used by the MAC calculation module 118.

In an embodiment utilizing the SSC APDU format of FIG. 2A, the current time window is not explicitly included in the SSC APDU. Instead, access control intervals corresponding to respective fixed time windows are utilized and it is assumed that the access control module knows the current time window.

The FIG. 2B format explicitly carries an indication of time in the SSC APDU. This approach has the advantage of specifying the particular time period for which the SSC APDU is valid. As there are 8,760 hours in a year, the Start Hour and Duration fields may be used to uniquely indicate respective starting and ending hours. Alternative time indication arrangements could be used to reduce the bit widths of these fields.

It is to be appreciated that the particular SSC APDU and MAC calculation formats of FIGS. 2A through 2C are presented by way of example only, and should not be construed as limiting the scope of the invention in any way. Numerous other credential formats and message authentication code calculations may be used in other embodiments.

In some embodiments, the central manager 107 can delegate to another system entity, such as one of the users, an ability to generate credentials for a limited time period comprising multiple access control intervals. Delegation of SSC APDU generation capability by the central manager 107 can be configured so as to allow the user to generate these values without having a network connection to the central manager.

This delegation functionality may be achieved by making the provisioned MAC key vary with time. For example, the MAC key values can be periodically rotated in a manner similar to the variation of the IHVs over time. One way to implement such rotation is to configure the MAC key values as respective intermediate values of another hash chain, although other types of key derivation functions may be used. In these and other arrangements, the access control modules 112 are configured to automatically rotate their MAC key values at predetermined time intervals, such as once a week. Each time interval is associated with a different MAC key corresponding to an intermediate value from a hash chain. The access control modules 112 are therefore provisioned with initial and final values of this additional hash chain, in addition to the final value of the hash chain used to produce to the IHVs that are incorporated into the SSC APDUs. The access control modules 112 can determine the current time and therefore knows which of the MAC keys to use at any particular time.

Delegation arrangements of the type described above allow the central manager 107 to grant a particular user or other designated system entity the ability to generate SSC APDUs for a limited period of time. If an additional hash chain is used to rotate the MAC key values, the central manager 107 simply has to selectively release to the system entity a particular subset of the IHV and MAC key values from their respective hash chains. The system entity cannot invert either of the corresponding hash functions and therefore can only generate the delegated part of each hash chain.

This is particularly useful in the context of disaster resilience, in that the central manager 107 could release future THY and MAC key values to an offshore or cloud repository for some limited time period, thereby allowing the repository to issue SSC APDUs in the event the central manager becomes inaccessible.

It should be noted that the system entity to which the central manager 107 delegates an ability to generate SSC APDUs could be a software entity of the system, such as a program running on a Hardware Security Module (HSM) that additionally imposes its own access control provisions.

The illustrative embodiments described above provide secure access to protected resources by generating credentials for respective access control intervals using both message authentication codes and intermediate values of a hash chain. One or more such embodiments advantageously provide secure credentials that have a limited number of characters and can therefore be easily entered by a user at a terminal or other user device. Moreover, enhanced security is provided through features such as iterating the hash function, separately computing a message authentication code using received authentication information such as a user password, and combining an intermediate hash chain value and a message authentication code into an SSC APDU or other credential using a function such as XOR.

It is to be appreciated that the particular set of elements shown in FIG. 1 for providing access control based on SSC APDUs or other credentials generating using message authentication codes and intermediate values of a hash chain is presented by way of example, and in other embodiments additional or alternative elements may be used. Thus, another embodiment may include additional networks and additional sets of computers, storage devices or other types of processing devices.

As indicated previously, various elements of system 100, such as credential generation module 108, access control modules 112, and other modules 120, 122 and 124, may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices.

Although described in the context of storage arrays, the disclosed techniques are applicable to a wide range of other types of deployed equipment or other protected resources.

In some embodiments, the hash chain intermediate values correspond to access control intervals defined by discrete periods of time, although it is to be appreciated that other techniques may be used to define access control intervals in other embodiments.

In the credential generation module 108, a particular hash function, an initial value and the number of time intervals to be supported are determined. As indicated previously, various known one-way hash functions such as MD5, SHA-1 and SHA-256 may be used as the hash function. Also, a cryptographic key may be selected as the initial value. The initial value must be protected in order to protect the security of the access control process, and accordingly should be stored in a secure memory accessible only to the credential generation module 108 or its associated central manager 107. The number of time intervals to be supported may be selected to accommodate at least the expected useful lifetime of the storage array. As an illustrative example, if the time intervals have a duration of one month, generating a hash chain having about 10,000 intermediate values would handle many more years than the expected lifetime of the storage array.

The disclosed embodiments facilitate service technician access to storage arrays and other deployed processing equipment while also avoiding the above-noted "break once, run anywhere" vulnerability associated with convention arrangements. For example, in the context of the storage arrays 110 of FIG. 1, the use of credentials based on both message authentication codes and intermediate hash chain values can ensure that compromise of information that is used to validate credentials for one storage array does not jeopardize the security of other storage arrays.

In an embodiment involving multiple hash chains having distinct initial values, where different final values are provided to different access control modules, the distinct initial values of the respective hash chains may be derived from a common key. For example, each of the storage arrays 110 may have associated identifying information, and the distinct initial values of the respective hash chains used to protect access to the respective storage arrays may each be determined as a function of the common key and the identifying information for the corresponding storage array.

It is also possible to use the same base hash chain configuration to produce multiple distinct final values. For example, one could combine an identifier of the storage array with a common initial value using addition, XOR or other similar function.

In some embodiments, efficiency advantages can be gained by replacing a linear hash chain with one based on a tree structure. For example, a given hash chain may comprise a tree having one or more interior branches each defined by application of a one-way hash function to a common key and identifying information.

As mentioned above, the information processing system 100 of FIG. 1 may be implemented using a processing platform comprising at least one processing device having a processor coupled to a memory. One or more of the processing modules or other components of system 100 may therefore each run on a computer, server, storage device or other processing platform element. A given such element may be viewed as an example of what is more generally referred to herein as a "processing device."

Referring now to FIG. 3, portions of the information processing system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may encompass the entire system 100 or only portions of that system, such as one or more of the terminals 102, protected resources 104, credential generation module 108, or other modules 120, 122 and 124.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of system 100.

Figure 4:
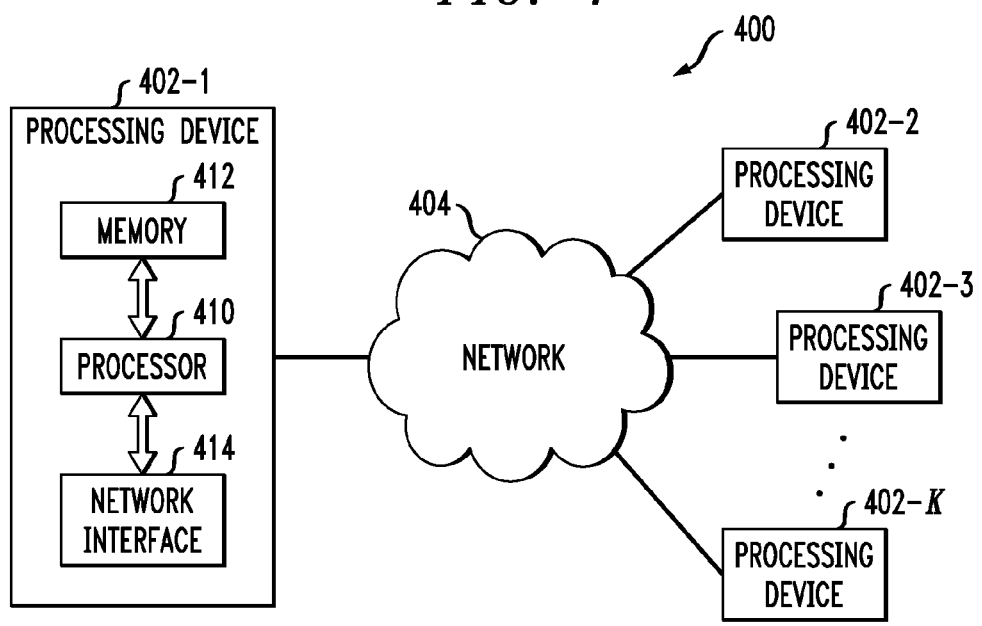

Another example of a processing platform that may be utilized in implementing the system 100 is processing platform 400 shown in FIG. 4.

The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Multiple elements of information processing system 100 may be collectively implemented on a common processing platform of the type shown in FIG. 3 or 4, or each such element may be implemented on a separate processing platform.

Referring now to FIG. 5, an example of one possible association between intermediate hash chain values and respective access control intervals is shown. This may be viewed as an example of a time-synchronous embodiment in which the hash chain intermediate values correspond to access control intervals defined by discrete periods of time. More particularly, in this example, the access control intervals are defined as respective months.

Starting from an initial value, the steps of the previously-described hash chain generation are iterated 11 times to produce a sequence of 10 intermediate values numbered 1 through 10 followed by a final value, with the hash iteration process being indicated by the right-facing arrow.

The final value itself is not used to generate a valid credential, but the intermediate value 10 that immediately precedes it is used to generate a valid credential. This last intermediate value 10 is associated with the first access control interval, which is the month of February in this example. The other intermediate values 9 through 1 are then associated with the other access control intervals, continuing in the reverse ordering indicated by the left-facing arrow. More particularly, intermediate values 9 through 1 are associated with respective access control intervals denoted in the figure as March, April, May, June, July, August, September, October and November. Thus, in the present embodiment, the intermediate values at the end of the hash chain are associated with the earliest access control intervals.

Although months are used in this example, other time intervals such as hours, days, weeks may be used to define access control intervals in other embodiments.

Embodiments of the invention can be configured to provide a one-time passcode mechanism where each intermediate hash value and its corresponding SSC APDU or other credential is used only once, and then discarded.

In one possible arrangement of this type, there is assumed to be only one verifier checking the intermediate hash value from the SSC APDU against the stored final value. The verifier may comprise a given one of the access control modules 112, or another system entity. After an SSC APDU based on a given intermediate hash value is used, the SSC APDU or the given intermediate hash value is then marked as used by the verifier, and cannot be used again. This makes the corresponding SSC APDU a single-use code, and allows the system to defend against a replay of a previously issued SSC APDU.

For example, the last used SSC APDU or the intermediate hash value on which it is based may be associated with the previously-described "high water mark" such that this SSC APDU and all previously used SSC APDUs are no longer valid. Even if one or more intermediate hash values have not been used, for example, if hash value 10 of FIG. 5 was never seen by the verifier, and the verifier sees hash value 8, the verifier would set the high water mark at hash value 8, and disallow any future use of hash values 8, 9, or 10. Such an arrangement advantageously prevents replay of an old SSC APDU. It also prevents other attacks in which the attacker tries to intercept an intermediate hash chain value and use it to generate other hash chain values closer to the final value.

Instead of maintaining a separate high water mark, the verifier could instead simply update the stored final value to the hash value of the last valid SSC APDU. For example, if the verifier sees hash value 8 of FIG. 5, the verifier would simply prune the hash chain making hash value 8 the new final value. As a result, there would be no way for an attacker to ever use hash value 8, or the now non-existent hash values 9 or 10. This also makes subsequent authentications more efficient, in that fewer applications of the hash function will be required to reach the new final value, while also maintaining protection against the attacks described previously.

As mentioned previously, functionality such as that described in conjunction with the system and format diagrams of FIGS. 1, 2 and 5 can be implemented at least in part in the form of one or more software programs stored in memory and executed by a processor of at least one processing device such as a computer or server. A memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing platform and processing device configurations. Also, different arrangements of protected resources, credential generation modules, access control modules, hash chains, hash functions, message authentication codes, access control intervals, hash value to interval associations, and access control processes may be used. Numerous other alternative embodiments within the scope of the appended claims will be readily apparent to those skilled in the art.

What is claimed is:

1. A method comprising:
receiving authentication information from a user;
generating a message authentication code based at least in part on the received authentication information;
associating intermediate values of a hash chain with respective ones of a plurality of access control intervals;
generating a credential for a particular one of the plurality of access control intervals based at least in part on the message authentication code and the intermediate value of the hash chain associated with the particular access control interval; and
providing the credential to a user in order to allow the user to access a protected resource in the particular access control interval;
wherein the receiving, generating, associating and providing are performed by at least one processing device of an information processing system.

2. The method of claim 1 wherein the receiving, generating, associating and providing are performed by a central manager implemented on said at least one processing device.

3. The method of claim 2 further comprising delegating from the central manager to another system entity an ability to generate credentials for one or more other ones of the plurality of access control intervals.

4. The method of claim 1 wherein the authentication information comprises a password provided by the user and wherein access to the protected resource in the particular access control interval requires the user to provide that password and the credential to an access control module associated with the protected resource.

5. The method of claim 1 wherein generating the message authentication code comprises generating the message authentication code using at least one key that is provisioned to the protected resource.

6. The method of claim 5 wherein values of the key used to generate the message authentication code are unique to the protected resource and are periodically rotated.

7. The method of claim 6 wherein the rotated key values comprise respective intermediate values of a hash chain.

8. The method of claim 1 wherein generating the message authentication code comprises:
forming a message payload comprising at least a password provided by the user; and
generating the message authentication code over the message payload.

9. The method of claim 8 wherein the message payload further comprises one or more of:
at least one field providing an indication of a time period for which the credential is valid;
a version indicator field;
a user identifier field; and
a role and activity field providing information for utilization by the protected resource to determine an appropriate level of access for the user.

10. The method of claim 1 wherein generating the credential comprises:
generating the credential in a binary format; and
encoding the credential into an encoded format having a reduced number of digits relative to the binary format;
wherein the credential is provided to the user in at least one of the binary format and the encoded format.

11. The method of claim 1 wherein the credential comprises a combination of the message authentication code and the intermediate value of the hash chain.

12. The method of claim 1 further comprising:
providing a final value of the hash chain to an access control module associated with the protected resource; and
storing an initial value of the hash chain in a secure manner.

13. The method of claim 1 wherein a given one of the intermediate values of the hash chain is generated by:
applying a hash function to a previous value of the hash chain a designated number of times; and
truncating a resulting value to a designated number of bits to obtain the given intermediate value.

14. The method of claim 1 wherein the credential comprises one or more of:
a user identifier field; and
a role and activity field providing information for utilization by the protected resource to determine an appropriate level of access for the user.

15. The method of claim 1 wherein the credential comprises at least one field providing an indication of a time period for which the credential is valid.

16. The method of claim 15 wherein said at least one field providing an indication of the time period for which the credential is valid comprises:
a start time field indicating a start time of the particular access control interval; and
a duration field indicating a duration of the particular access control interval.

17. A computer program product comprising a non-transitory processor-readable storage medium having encoded therein executable code of one or more software programs, wherein the one or more software programs when executed by at least one processing device cause the method of claim 1 to be performed.

18. The method of claim 1 wherein one or more of the intermediate values of the hash chain associated with respective ones of the plurality of access control intervals comprise truncated values of the hash chain.

19. An apparatus comprising:
at least one processing device comprising a processor coupled to a memory;
the processing device being configured to receive authentication information from a user, to generate a message authentication code based at least in part on the received authentication information, to associate intermediate values of a hash chain with respective ones of a plurality of access control intervals, to generate a credential for a particular one of the plurality of access control intervals based at least in part on the message authentication code and the intermediate value of the hash chain associated with the particular access control interval, and to provide the credential to a user in order to allow the user to access a protected resource in the particular access control interval.

20. The apparatus of claim 19 wherein the protected resource comprises a storage array having an associated access control module implemented using said at least one processing device.

21. A method comprising:
receiving a credential from a user attempting to access a protected resource in a particular one of a plurality of access control intervals;
generating a message authentication code based at least in part on the credential;
utilizing the generated message authentication code to identify an intermediate value of a hash chain in the credential; and
if the identified intermediate value of the hash chain matches an expected intermediate value of the hash chain associated with the particular access control interval, granting the user access to the protected resource in the particular access control interval;
wherein intermediate values of the hash chain are associated with respective ones of the plurality of access control intervals; and
wherein the receiving, generating, utilizing and granting are performed by at least one processing device of an information processing system.

22. The method of claim 21 wherein if the identified intermediate value of the hash chain matches the expected intermediate value of the hash chain, the identified intermediate value is associated with a high water mark indicator.

23. The method of claim 21 wherein if the identified intermediate value of the hash chain matches the expected intermediate value of the hash chain, a stored final value of the hash chain is updated to the identified intermediate value.

24. The method of claim 21 wherein the receiving, generating, utilizing and granting are performed by an access control module implemented on said at least one processing device.

25. The method of claim 21 further comprising:
storing information indicative of a latest access control interval for which a valid credential has been received from a user;
comparing a current access control interval associated with a given received credential with the stored information indicative of the latest access control interval; and
denying access to the protected resource if the current access control interval precedes in time the latest access control interval indicated by the stored information.

26. A computer program product comprising a non-transitory processor-readable storage medium having encoded therein executable code of one or more software programs, wherein the one or more software programs when executed by at least one processing device cause the steps of the method of claim 21 to be performed.

27. An apparatus comprising:
   at least one processing device comprising a processor coupled to a memory;
   the processing device being configured to receive a credential from a user attempting to access a protected resource in a particular one of a plurality of access control intervals, to generate a message authentication code based at least in part on the credential, to utilize the generated message authentication code to identify an intermediate value of a hash chain in the credential, and if the identified intermediate value of the hash chain matches an expected intermediate value of the hash chain associated with the particular access control interval, granting the user access to the protected resource in the particular access control interval, wherein intermediate values of the hash chain are associated with respective ones of the plurality of access control intervals.

28. The apparatus of claim 27 wherein the protected resource comprises a storage array having an associated access control module implemented using said at least one processing device.

* * * * *